July 10, 1962 O. B. SNEATH 3,044,054

RECEIVER FOR ELECTROMAGNETIC SIGNALS

Filed May 9, 1957 3 Sheets-Sheet 1

INVENTOR

Oswald Barber Sneath

BY

Stevens, Davis, Miller & Mosher his ATTORNEYS

INVENTOR
Oswald Barber Sneath
BY
Stevens, Davis, Miller & Mosher
his ATTORNEYS

INVENTOR
Oswald Barber Sneath
BY
Stevens, Davis, Miller & Mosher
his ATTORNEYS

United States Patent Office 3,044,054

Patented July 10, 1962

3,044,054

RECEIVER FOR ELECTROMAGNETIC SIGNALS

Oswald Barber Sneath, London, England, assignor to Multitone Electric Company Limited, London, England Filed May 9, 1957, Ser. No. 658,148
Claims priority, application Great Britain May 16, 1956
4 Claims. (Cl. 340—311)

Figure 1:
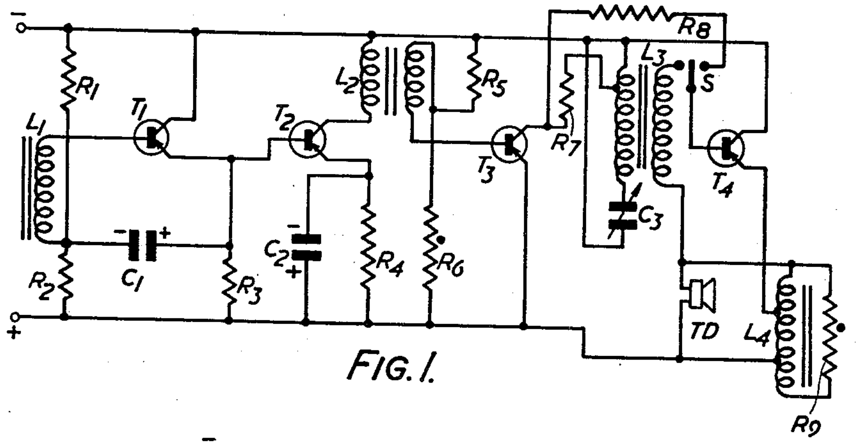

This invention relates to receivers suitable for use with call systems comprising a central transmitter capable of transmitting signals at a number of different frequencies and a number of receivers each selective to a particular frequency which is different from the others, so that a desired receiver can be called by transmitting a signal at the corresponding frequency. The invention is particularly applicable to, but is not limited to, receivers which operate by audio-frequency induction.

The practical requirements for systems as described above are that a comparatively large number of channels be available and this in turn requires that the receiver operating on each channel should possess a high degree of selectivity. Difficulties have however been experienced in meeting these requirements, particularly where the receivers are to be of a very small size as is the case where the receivers are to be carried about the person. One particular difficulty is to design the receiver so that it can discriminate between a weak signal on its own channel frequency and a strong signal on an adjacent channel frequency.

In accordance with one feature of this invention, improved frequency discrimination is achieved by employing a receiver having an amplifier/limiter circuit followed by a frequency discriminating circuit the output from which controls the operation of a signalling device such as a sound-producing transducer. In this arrangement the amplifier/limiter circuit, which may comprise two or more stages of transistor amplification, serves to bring up to substantially the same predetermined level of magnitude a weak signal at the frequency at which the discrimination circuit is tuned and a strong signal at an adjacent frequency. In this way, the output from the frequency discriminator circuit always shows a peak, more or less pronounced according to the selectivity of the circuit, at the frequency of the signal to which it is intended that the receiver should respond to give an audible or other indication. Coupled with the frequency discriminator circuit is any sound producing or other signalling circuit arranged to operate only when the frequency discriminator circuit receives a near peak signal of the frequency to which it is tuned. Preferably the output from the frequency discriminator circuit triggers an audio-frequency oscillator the output of which is applied to a sound cy oscillator the output of which is applied to a sound producing device such as a miniature earpiece of the type used in deaf aid apparatus. This latter arrangement constitutes a further feature of the invention now to be described.

Preferably the oscillator employs a transistor connected as a relaxation oscillator which operates only when triggered by the output from the frequency discriminator circuit and which, when such output ceases, becomes quiescent after a short period of oscillation. The advantage of this arrangement is that the frequency of the warning signal produced is largely independent of the frequency of the received signal which triggers the oscillator. The advantage of an audible warning signal whose frequency is substantially independent of that of the received signal is twofold. In the first place, neither the human ear nor sound-producing transducers such as earpieces are uniformly efficient over the whole audio range, and an optimum frequency can therefore be selected. In the second place, the transmitted signals may extend in frequency beyond the audible range thereby increasing the number of available channels.

Thus, the receivers may each produce an audio-frequency note of, e.g. 1–2 kcs. and these notes are of substantially constant intensity over a wide range of channel frequencies and amplitude. If the range of channel frequencies emitted by the transmitter is from 2–15 kcs., about 50 to 60 individual channel frequencies and associated receivers can conveniently be accommodated within this range, the frequency spacing between individual channels varying from about 150 c.p.s. at the lower end of the range to about 300 c.p.s. at the higher end.

As an alternative to a relaxation oscillator, acoustic feed-back may be used in cases in which the receiver produces a sound signal. To this end, a microphone may be incorporated in the input to the oscillator so as to produce oscillation by acoustic feedback between the sound producer and the microphone. The microphone and the sound producer may with advantage have similar acoustic characteristics and may, for example, consist of identical miniature earpieces although the electrical impedances need not necessarily be identical. Conveniently, the miniature earpieces may be situated in a chamber which is partially opened to the outside air and which acts as a resonator. The advantage of acoustic feedback is that oscillation is produced at a frequency at which the sound producer, and its resonant chamber if used, act efficiently.

In a preferred miniature form, the receiver is relatively long and of round oval or rounded rectangular cross-section, and the sound-producing transducer, which is situated at the top, opens directly or through a sound reinforcing resonant cavity upwards and thus towards an ear of the person in whose pocket the receiver is. To reduce trouble through feedback, the coil of the frequency selective filter is close to the sound-producing transducer and the pick-up coil is as far removed as possible from both these, e.g. at the bottom of the casing, possibly at the side of the cell. It is also an advantage if the coil and transducer are in a metal tube, the metal being either ferromagnetic or of high conductivity, for example aluminium; while the casing of the bottom part of the receiver is a non-conductor so as not to shield the pick-up coil. Alternatively, the lower part of the housing may be of metal but slotted to reduce screening due to circulating currents.

The frequency selective circuit of the receiver can, if desired, be cut out by means of a switch so that the receiver functions as an audio amplifier although, owing to the limited power available, it may be necessary to remove it from the pocket and raise it to the ear. The switch may be worked by pressing the top end of a pivoted clip, the bottom end of which normally clips it to the pocket. It will, in general, not be necessary to obtain full gain from all the stages when switched as a speech amplifier.

Embodiments of the invention will now be described by way of example with reference to the accompanying drawings, in which:

FIG. 1 is a circuit diagram of a receiver for use in an audio induction type of system described earlier; and FIGS. 2–7 are circuit diagrams showing modifications of parts of the circuit of FIG. 1.

Referring now to FIG. 1, the circuit there shown consists essentially of the following: an audio frequency induction pick-up coil $L_1$; a three-stage amplifier constituted by three junction transistors $T_1$, $T_2$ and $T_3$ together with associated resistances $R_1$—$R_7$, condensers $C_1$ and $C_2$ and a transformer $L_2$, the third stage consisting of the transistor $T_3$, resistors $R_5$, $R_6$, $R_7$ and transformer $L_2$ constituting an amplification limiting stage; a frequency selective filter constituted by transformer $L_3$ and variable condenser $C_3$; an oscillatory circuit constituted by a transistor $T_4$ and associated transformer $L_4$ and resistance $R_9$; and a sound-producing transducer TD. In addition, the circuit of FIG. 1 includes a two-way switch S and associated resistance $R_8$ to convert the receiver into a straight audio frequency amplifier for speech reproduction.

The pick-up coil $L_1$ consists of a small bobbin containing laminations about 1" long. This coil may be identical for all frequencies in the band covered by the transmitter, but for the maximum sensitivity it is advantageous to employ fewer turns as the frequency increases. Coil $L_1$ is connected to the transistor $T_1$ in what is functionally a grounded emitter circuit. The resistances $R_1$ and $R_2$ control the potential of the base and hence the current flowing through $R_3$. The emitter of $T_1$ is connected to the base of the transistor $T_2$, the emitter of which is fed through the resistance $R_4$ shunted by the by-pass condenser $C_2$. The collector of $T_2$ is coupled through the step down transformer $L_2$ to the base of $T_3$. The ground side of the transformer secondary is connected to the junction of the potential dividing resistances $R_5$ and $R_6$. The resistor $R_6$ may with advantage be of the type having a high negative temperature coefficient as otherwise the current through $T_3$ will increase rapidly with temperature. By adjusting the values $R_5$ and $R_6$ so that approximately half the supply voltage is dropped across the resistance $R_7$ when strong signals are being picked up the second harmonic production in the collector circuit of $T_3$ is minimized. The collector circuit of $T_3$ contains the limiting resistance $R_7$ in series with part of the primary winding of the transformer $L_3$ which has a "Ferroxcube" which is tuned by the adjustable mica condenser $C_3$ to constitute the frequency selective filter.

As shown, the base of the oscillatory transistor $T_4$ can be switched by means of switch S through the resistance $R_8$ to the collector of $T_3$ and in this case speech can be received as the receiver will then respond to all frequencies. The selective effect of the tuned circuit constituted by transformer $L_3$ and condenser $C_3$ is not then very noticeable as it is in series with the ohmic resistance $R_7$. Alternatively, the base can be switched through the secondary of $L_3$ to a tap on the winding of the auto-transformer $L_4$, which is also connected to the emitter of $T_4$ and to the positive of the supply.

The transducer TD connected across part of the winding of transformer $L_4$ is conveniently a miniature earpiece of medium impedance, say 300 ohms at 1000 cycles. The resistance $R_9$ shunted across $L_4$ has a negative temperature coefficient to compensate wholly or partly for the change of feed back due to temperature variation $T_4$. The circuit constituted by this resistance and transformer $L_4$ is such that the transistor $T_4$ oscillates when there is suitable negative bias on the base with respect to emitter; at the same time this circuit is such that oscillations if started are not maintained in the absence of bias. The signal voltage from the secondary of transformer $L_3$, however, causes oscillation to occur for so long as the signal persists. The resistance $R_9$ is connected in the particular manner shown in order to achieve a suitable matching to an available value of thermally variable resistor.

Figure 2:
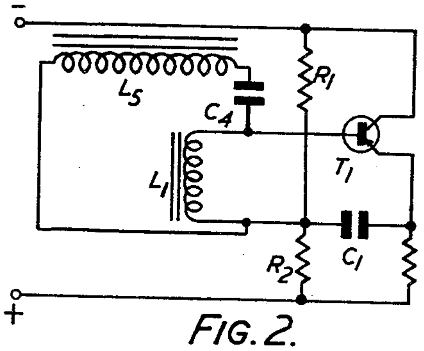

FIG. 2 shows a modification of the pick-up circuit of FIG. 1, such modification residing in the use of two pick-up transformers $L_1$ and $L_5$ set at an angle to each other. $L_5$ has a condenser $C_4$ connected in series with it, this condenser being of such value as to have approximately the same impedance as $L_5$ at the frequency to which the receiver is tuned; hence, the impedance of $L_1$ and $L_5$ being largely inductive, the signal from $L_1$ is out of phase at the base of $T_1$ with that of $L_5$ and $C_4$ in series.

Figure 3:
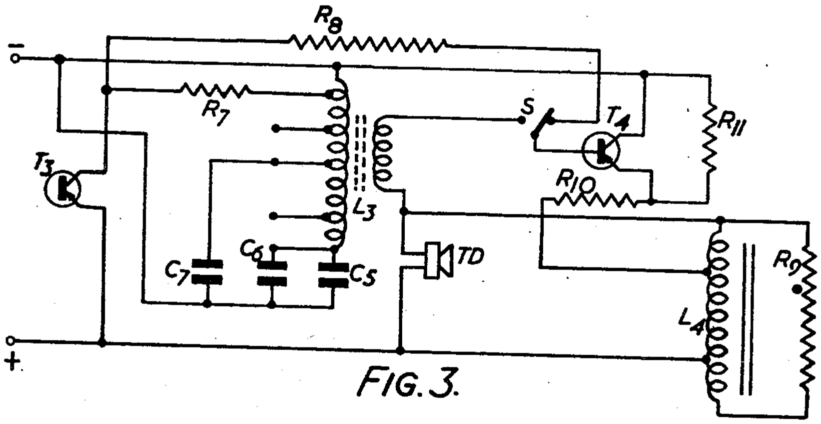

FIG. 3 shows two modifications of the circuits associated with transistors $T_3$ and $T_4$ in FIG. 1. Firstly the variable condenser $C_3$ is replaced by a fixed condenser $C_5$ but two additional fixed condensers $C_6$ and $C_7$ are employed which may be connected at will to one of a number of taps on $L_3$ to adjust the frequency of the selective filter. Secondly, the emitter of the transistor $T_4$ has a resistor $R_{10}$ connected between its emitter and the tap on $L_4$, and another resistor $R_{11}$ is connected between the emitter and the negative of the supply. The effect of this latter arrangement is to maintain the emitter at a negative potential relative to base in the absence of signal, and this renders a bigger signal necessary to initiate oscillation, thus making the receiver less susceptible to changes in the characteristics of $T_4$ caused by changes of temperature or replacement of $T_4$ by a transistor of slightly different characteristics. When employing this arrangement, a lower step-down ratio will be required as regards the secondary of $L_3$ than is the case with the circuit of FIG. 1. Either of the two modifications embodied in FIG. 3 may be utilised independently.

Figure 4:
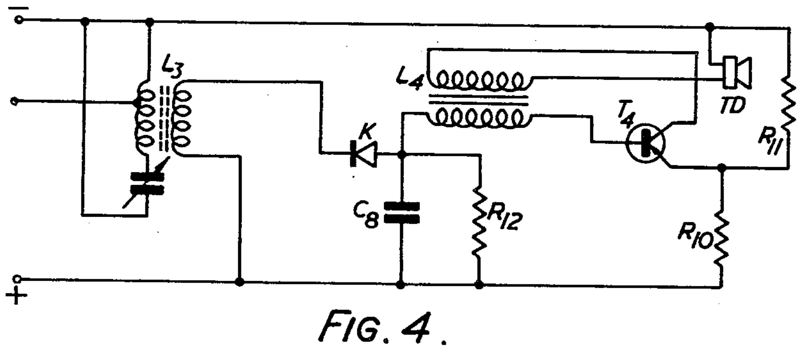

FIG. 4 shows a modification of the circuit of FIG. 1 in which the secondary winding of transformer $L_3$ is connected with a rectifier K and condenser $C_8$ and resistance $R_{12}$ so as to apply on the arrival of a signal a negative bias to the base of $T_4$ with respect to positive. The emitter of $T_4$ is given a negative bias with respect to base by resistors $R_{10}$ and $R_{11}$ as in FIG. 3. In this circuit $L_4$ is a double wound transformer and the connections thereto are modified as shown.

Figure 5:
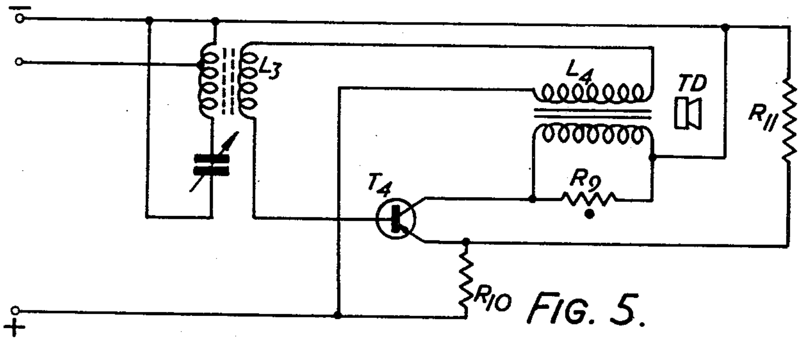

FIG. 5 shows a modification of the circuit of FIG. 1 according to which the transformer $L_4$ is constituted by a second winding on the sound producing device TD. Biassing arrangements for $T_4$ are as in FIGS. 3 and 4.

Figure 6:
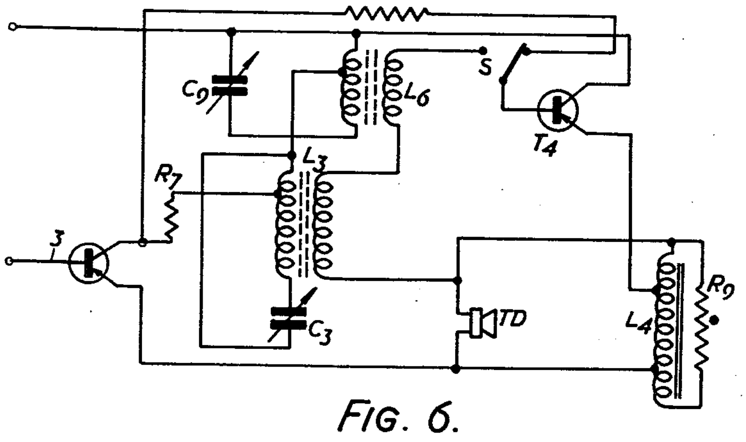

While with the arrangements hereinbefore described it is possible to call all receivers at the same time by transmitting their frequencies in turn or by scanning the frequency band, this has the limitation, where a large number of receivers are employed, that the call signal is of short duration relative to the interval at which it can be repeated. Accordingly, it may be desirable to make all receivers responsive to a common frequency as well as to their own particular call frequencies, this common frequency being employed to transmit general calls intended for all receivers as opposed to one individual receiver. An arrangement for this purpose is shown in FIG. 6 which is a modification of FIG. 1, the modification involved being the inclusion of a second frequency selective circuit composed of transformer $L_6$ and condenser $C_9$ tuned to the common frequency. This second frequency selective circuit can be reduced in size if a somewhat broad frequency band at the high frequency end is allocated to general calls and may consist, for example, solely of an air-cored transformer relying on self-capacity for tuning.

Figure 7:
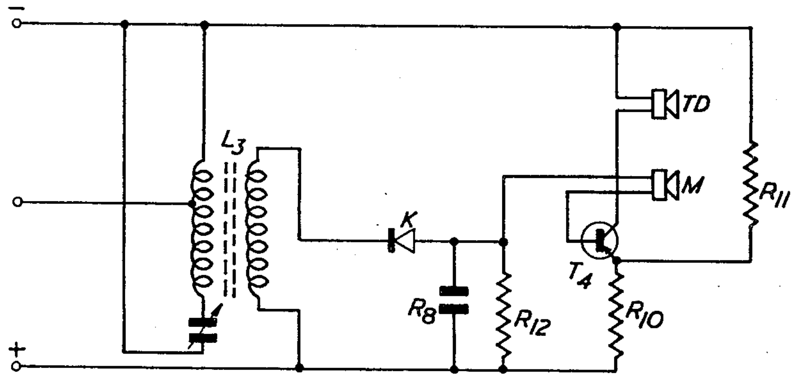

FIG. 7 shows a modification of the circuit illustrated in FIG. 4 in which acoustic feedback is employed. A microphone M is arranged near the transducer TD so as to pick up sound therefrom and feedback electrical energy into the base circuit of the transistor $T_4$ thus producing oscillation.

As a guide to the order of magnitude of the components it may be mentioned that a coil $L_1$ of 2,000 turns of 48 S.W.G. on a core of approximately 1" long has been found satisfactory. $L_2$ may be a normal transistor interstage transformer. For $L_3$ a transformer having 3175 turns of 45 S.W.G. tapped at 3069, and a secondary of 80 turns of 45 S.W.G. has been found to be suitable for frequencies around 2,200 cycles per second. A winding of 500 turns of 37 S.W.G. tapped at 480 and a secondary of 12 turns of 37 S.W.G. has been found to be suitable for frequencies around 14,000 cycles per second. Intermediate windings would be used for intermediate frequencies. $L_4$ may be wound on a core similar to an interstage transformer and may consist of 1500 turns of 46 S.W.G. tapped at 400 and 1200, the outside end being that which is shown in the drawing as connected only to $R_9$. In conjunction with the values of $L_3$ mentioned above, $R_7$ would be chosen to give the selectivity required and would be of the order of 10,000 ohms.

While it is only necessary that the receivers for different frequencies should differ in the windings of the inductance and/or the capacity of the tuning condenser of the selective circuit, greater sensitivity may be obtained by making changes to the windings of the pick-up coil and the coupling transformer also.

In a modified construction of receiver according to the invention, the parameters of the oscillator circuit are such that oscillation, once started, will continue until it is interrupted, for example by shorting the feedback from the sound producer either by a manual switch or by a switch operated by the vibration of the receiver when it is moved.

A modified form of the invention may be constructed employing a loudspeaker of normal type for placing in a room to call a person in such room in which case the circuit up to the frequency selective filter may be the same but the triggered oscillator will be of greater power or, alternatively, may be similar to the embodiment described but followed by a quiescent amplifying stage. In either of these arrangements the no-signal current need be little if any higher than in the embodiment more fully described with reference to FIG. 1.

In another form suitable for use by the hard of hearing the sound-producing device may be replaced by a transducer producing mechanical vibration which may be appreciated either by bone conduction or by skin sensation. Alternatively, the output voltage from the oscillator may be stepped up and applied to the skin between two small contact electrodes to produce electrical stimulation on receipt of a signal.

Although the invention has been particularly described in its application to systems operating by audio frequency induction, it will of course be appreciated that the invention also finds application to modulated or unmodulated radio and higher frequency systems and to systems in which the central transmitter station is connected by wires to its associated receivers.

I claim:

1. A selective receiver for electromagnetic signals comprising a magnetic pick-up coil, an amplifier arranged to amplify signals picked up by said pick-up coil, said amplifier terminating in a limiter stage, a frequency selective filter immediately coupled to the amplifier, an oscillatory circuit capable of self-oscillation at a frequency substantially independent of the signal frequency when triggered by a signal from said frequency selective filter, means directly connecting said filter in triggering relation to said oscillatory circuit, and a signal device arranged to be operated by the output of said oscillatory circuit.

2. A small portable battery-operated selective receiver for electromagnetic signals, said receiver comprising a magnetic pick-up coil, an amplifier arranged to amplify signals picked up by said pick-up coil, said amplifier terminating in a limiter stage, a frequency-selective filter immediately coupled to the amplifier, an oscillatory circuit including a transistor having its base normally insufficiently negative with respect to its emitter to be capable of building up spontaneous oscillation but arranged to be set in oscillation by an incoming signal, means directly connecting said filter in triggering relation to said oscillatory circuit, and a signal device arranged to be operated by the output of said oscillatory circuit.

3. A receiver as claimed in claim 2, wherein the signalling device consists of a sound-producing transducer.

4. A small portable battery-operated selective receiver for electromagnetic signals, said receiver comprising a magnetic pick-up coil, an amplifier arranged to amplify signals picked up by said pick-up coil, said amplifier terminating in a limiter stage, a frequency-selective filter immediately coupled to the amplifier, an oscillatory circuit including a transistor and a transformer, means coupling the output of the oscillatory circuit to the circuit between the base and emitter of said transistor in the sense to provide positive feedback, means normally biasing said base negatively with respect to the emitter to an extent insufficient to cause spontaneous oscillation but such that said oscillatory circuit is set in oscillation by an incoming signal, means directly connecting said filter in triggering relation to said oscillatory circuit, and a signal device arranged to be operated by the output of said oscillatory circuit.

References Cited in the file of this patent

UNITED STATES PATENTS

| | | |
|---|---|---|
| 2,138,894 | Ware | Dec. 6, 1938 |
| 2,153,202 | Nichols | Apr. 4, 1939 |
| 2,435,262 | Wurmser | Feb. 3, 1948 |
| 2,470,573 | Moore | May 17, 1949 |
| 2,489,202 | Selinger | Nov. 22, 1949 |
| 2,630,482 | Bostwick | Mar. 3, 1953 |
| 2,757,287 | Stanley | July 31, 1956 |
| 2,802,938 | Herzog | Aug. 13, 1957 |
| 2,810,080 | Truesdale | Oct. 15, 1957 |
| 2,899,547 | Crow et al. | Aug. 11, 1959 |
| 2,941,161 | Scantlin | June 14, 1960 |

FOREIGN PATENTS

| | | |
|---|---|---|
| 1,071,308 | France | Mar. 3, 1954 |